United States Patent [19]

Currie

[11] Patent Number: 4,467,459

[45] Date of Patent: Aug. 21, 1984

[54] SEISMIC METHOD IMPROVING SIGNAL-TO-NOISE RATIO

[75] Inventor: William S. Currie, Bellaire, Tex.

[73] Assignee: Texaco Inc., White Plains, N.Y.

[21] Appl. No.: 337,032

[22] Filed: Jan. 4, 1982

[51] Int. Cl.³ .............................................. G01V 1/32
[52] U.S. Cl. ........................................ 367/21; 367/23
[58] Field of Search ................ 367/15, 20, 21, 49, 367/56, 23, 177; 181/110, 111, 103

[56] References Cited

U.S. PATENT DOCUMENTS

| | | | |
|---|---|---|---|
| 2,729,300 | 1/1956 | Paslay et al. | 181/110 |
| 3,065,815 | 11/1962 | Hersey et al. | 367/15 |
| 3,489,996 | 1/1970 | Moon et al. | 367/23 |
| 3,793,620 | 2/1974 | Miller | 367/56 |
| 4,038,630 | 7/1977 | Chelminski | 181/111 |
| 4,059,820 | 11/1977 | Turpening | 367/75 X |
| 4,101,866 | 7/1978 | Ruehle | 367/15 |
| 4,132,974 | 1/1979 | Mollere | 367/15 |
| 4,218,765 | 8/1980 | Kinkade | 367/49 |

Primary Examiner—Maynard R. Wilbur
Assistant Examiner—K. R. Kaiser
Attorney, Agent, or Firm—Robert A. Kulason; Carl G. Ries; Henry C. Dearborn

[57] ABSTRACT

A method for improving signal-to-noise ratio in seismic surveying. It involves generating a series of seismic charges at time spaced intervals but at the same location. A single record is made having a time duration sufficient to cover the maximum reflection time of interest plus the total time for the series of charges. And, thereafter, the record is processed by Fourier transform of the single record to the frequency domain and by constructing frequency domain representation of the series of time intervals plus using the latter to superimpose frequency domain representations of the seismic signals resulting from each of the seismic charges. Then the processing includes inversely transforming the superimposed frequency domain representations back to the time domain.

6 Claims, 25 Drawing Figures

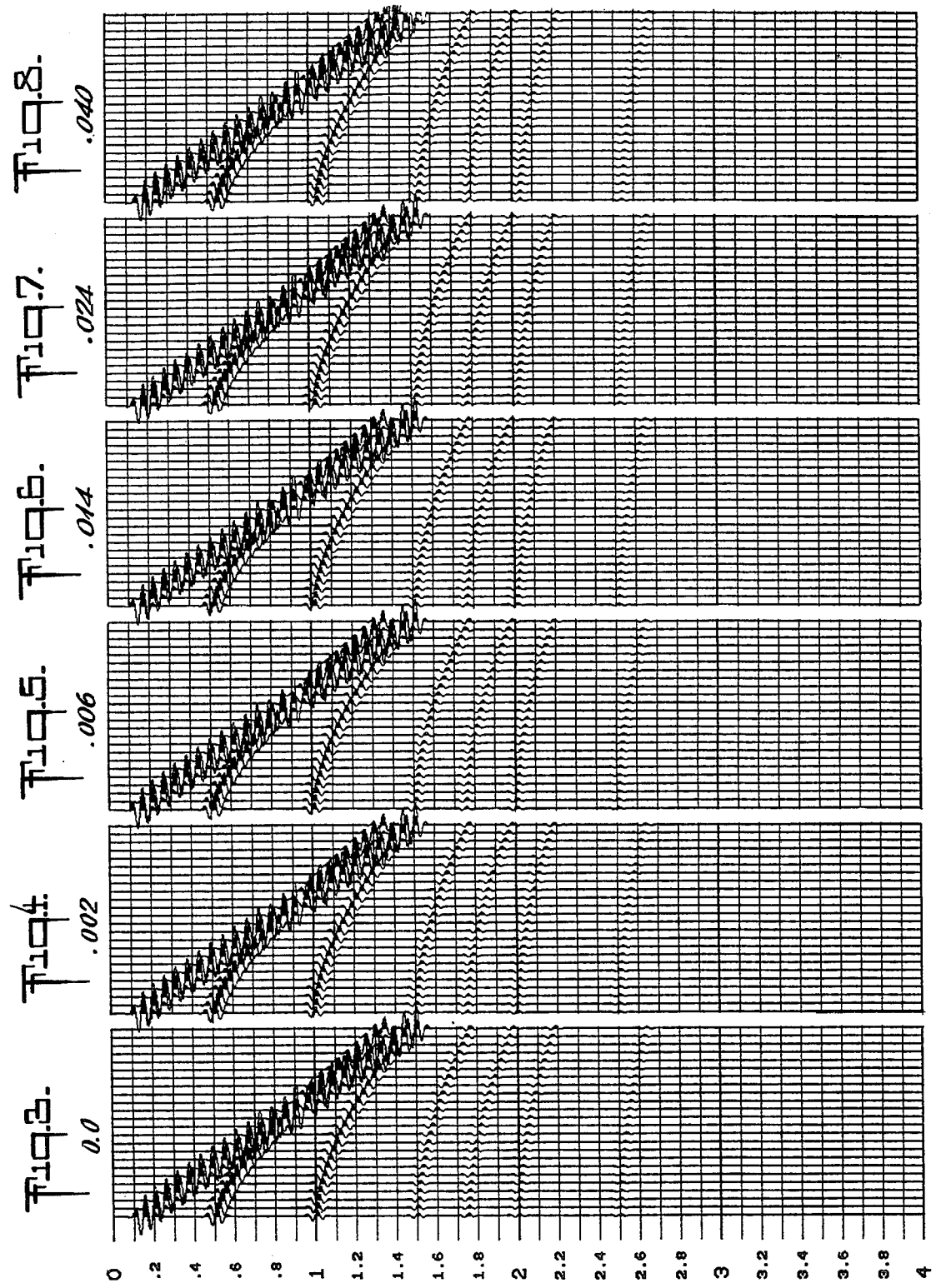

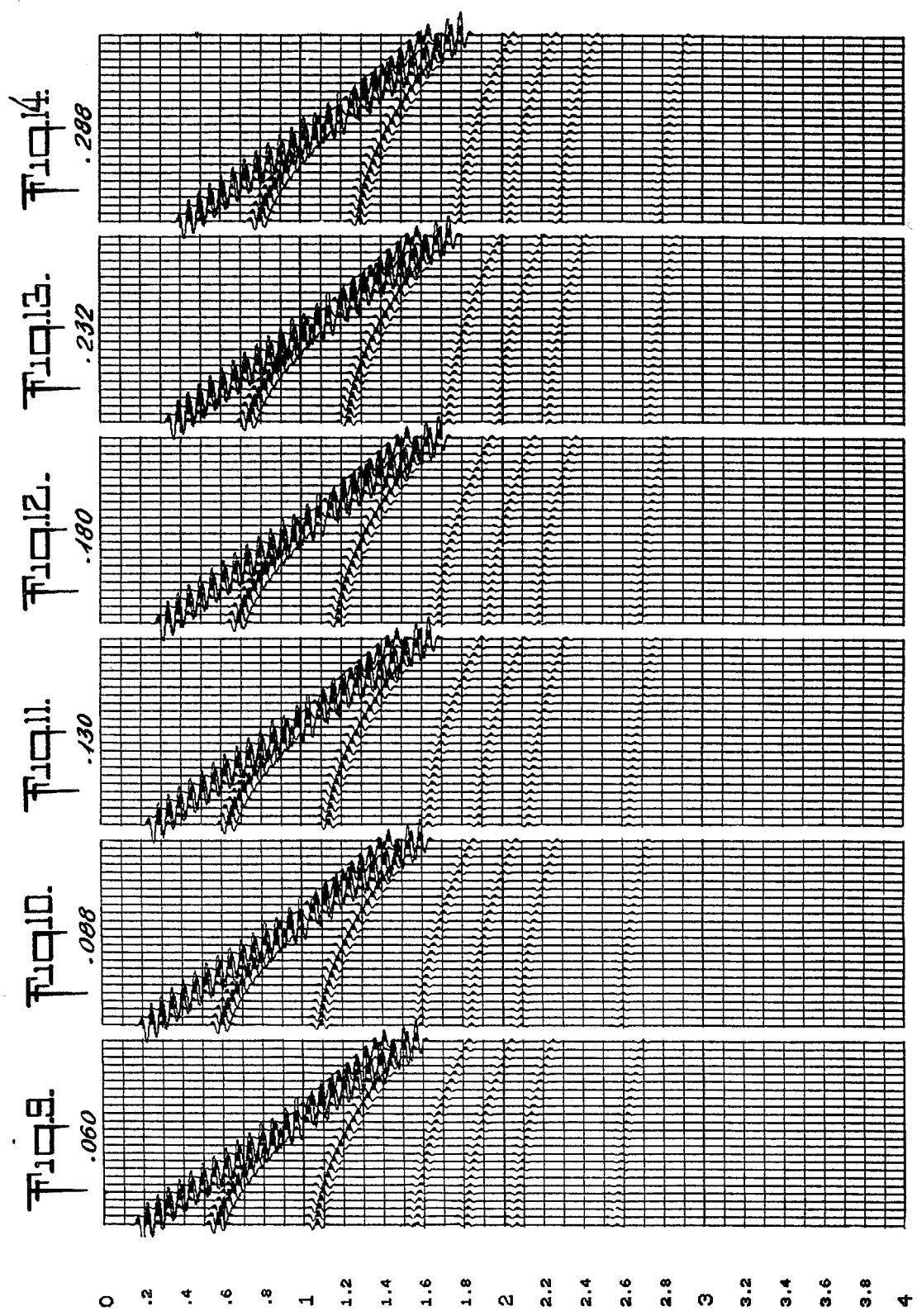

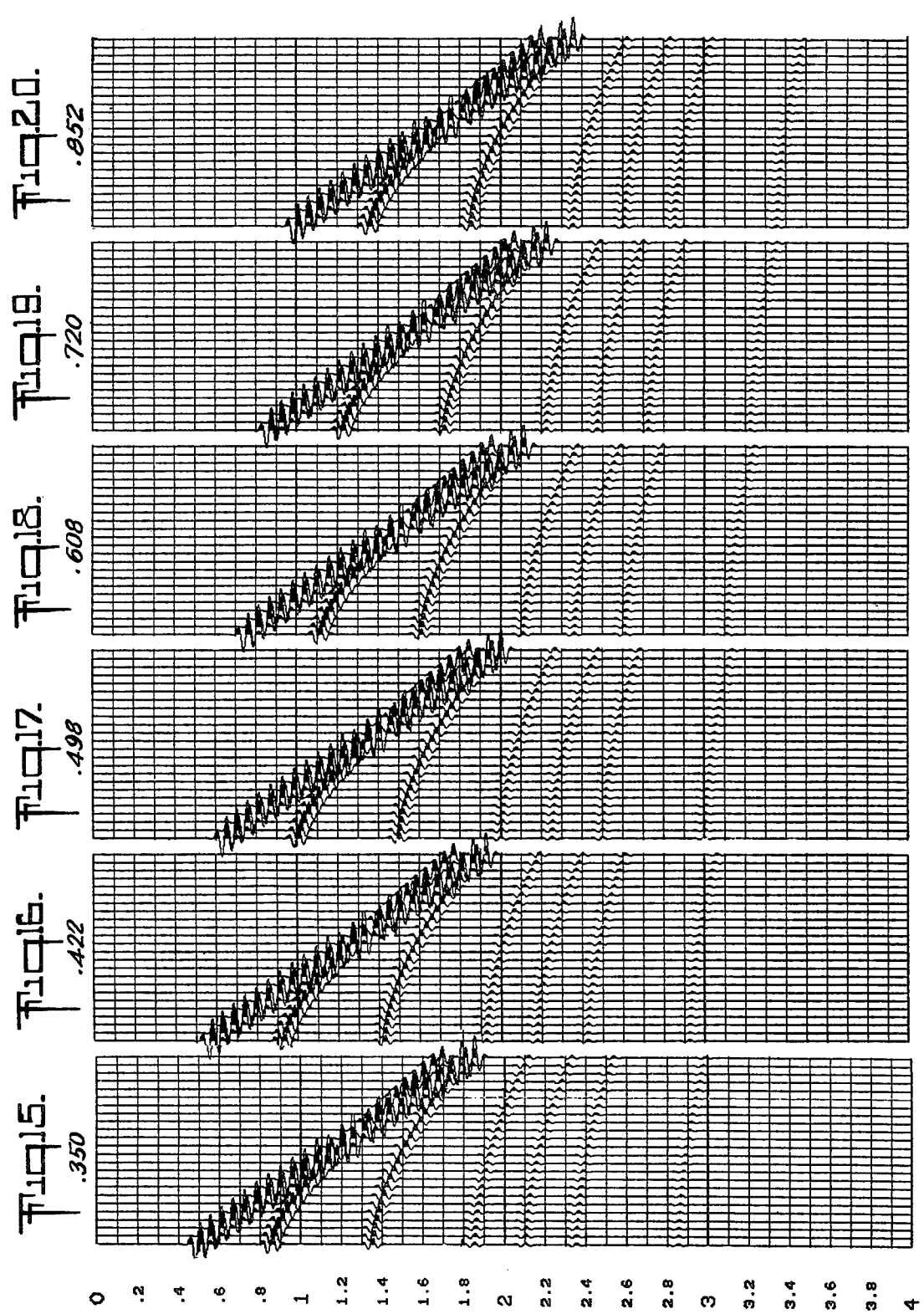

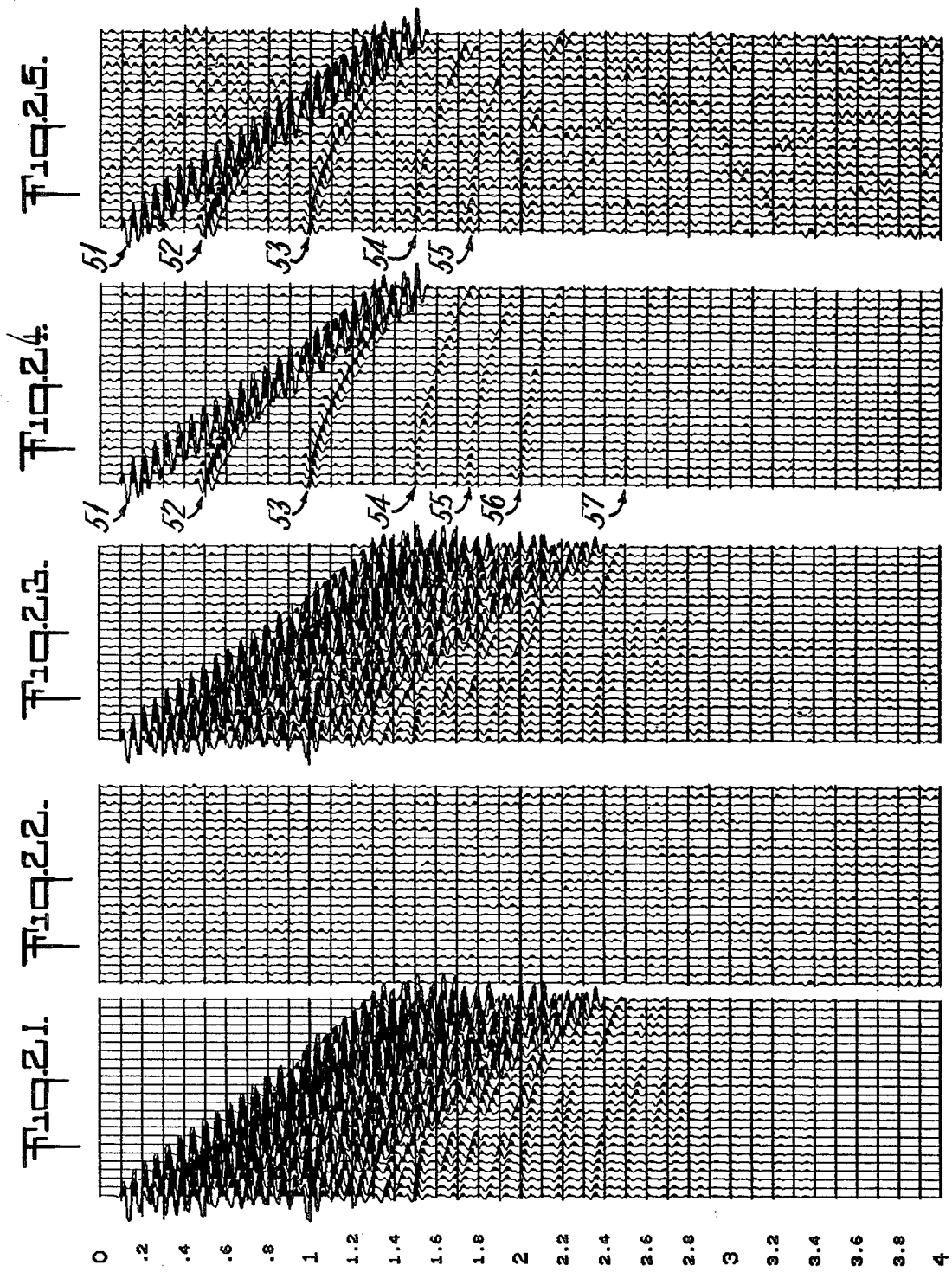

SEISMIC METHOD IMPROVING SIGNAL-TO-NOISE RATIO

BACKGROUND OF THE INVENTION

1. Field of the Invention

This invention concerns seismic surveying in general, and more specifically it concerns a method for improving the signal-to-noise ratio of seismic reflection type procedures.

2. Description of the Prior Art

In the field of seismic surveying in general, there have been numerous proposals and arrangements for obtaining better records. These have included a large number of different types of approach. The type of seismic surveying to which the subject application applies is known as reflection surveying. In that type of seismic surveying, there have been various suggestions for attempting to improve the results. For example, there is a U.S. Pat. No. 3,622,970 to Leon Sayous, et al that was patented Nov. 23, 1971. However, that patent deals with a system which employs auto-correlation of the signals involved. And, consequently it is not relevant to the applicant's invention.

Another prior patent is U.S. Pat. No. 4,170,002 to Booth B. Strange, issued Oct. 2, 1979. That patent concerns the use of several seismic accoustic sources which are selected from different genera of seismic energy source generators and are combined to make a single array. Furthermore, these sources are fired substantially simultaneously in order to obtain a single composit seismic wave. Thus the source signal blends together the different characteristics. On the other hand, the applicant makes use of a procedure which records a plurality of seismic source generations that are detonated in series with time intervals between. The resulting signals are recorded on a single record having sufficient time duration, and the record is processed thereafter.

Another prior patent is U.S. Pat. No. 3,602,878 to Sullivan patented Aug. 31, 1971. In that case, the procedure employed involves firing a plurality of air guns at different times but so related to one another as to enhance the accoustic wave oscillation characteristics. Its results are accomplished since the air guns are ones having different volume capacities, and the enhancement provides a particular seismic energy output. In contrast, the applicant is generating a series of seismic signals with time intervals therebetween. But, the applicant's arrangement is such that each one of the seismic signals is generated at the same location as all of the others. Then, after a single record has been taken of all of the signals generated, the result is processed in a manner so as to improve the signal-to-noise ratio.

SUMMARY OF THE INVENTION

Briefly, the invention concerns seismic surveying and deals with a method of improving signal-to-noise ratio. The method comprises generating a series of seismic charges at predetermined time intervals at the same location, and recording one seismogram of the signals received from said series having a time duration at least as long as the maximum reflection time of interest plus the total of said series of time intervals. It also comprises transforming said seismogram to the frequency domain, and constructing the frequency domain representation of said series of predetermined time intervals, and using same to superimpose the frequency domain representations of the seismic signals resulting from each said seismic charge. And, it also comprises inversely transforming said superimposed frequency domain representation back to the time domain whereby a noise-reduced seismogram is obtained.

Once more, briefly, the invention concerns marine type seismic surveying and it related to a method of improving the signal-to-noise ratio. It comprises towing a plurality of seismic generators past a predetermined location, and detonating each of said generators at said predetermined location by timing said detonations relative to said towing speed. It also comprises recording one seismogram of the seismic signals received from said detonations, such seismogram having a time duration at least as long as the maximum reflection time of interest plus the total time between all of said detonations. It also comprises transforming said seismogram to the frequency domain, and constructing the frequency domain representation of said time intervals and using same to superimpose the frequency domain representations of the seismic signals resulting from each said detonation. It also comprises inversely transforming said superimposed frequency domain representations back to the time domain whereby a noise-reduced seismogram is obtained.

BRIEF DESCRIPTION OF THE DRAWINGS

The foregoing and other objects and benefits of the invention will be more fully set forth below in connection with the best mode contemplated by the inventor of carrying out the invention, and in connection with which there are illustrations provided in the drawings, wherein:

FIGS. 3–20 illustrate eighteen synthetic seismograms produced by firing a seismic source at a series of time intervals beginning at zero for FIG. 3 and progressing to 852 milliseconds for FIG. 20, in steps at 2, 6, 14, 24, 40, 60, 88, 130, 180, 232, 288, 350, 422, 498, 608, 720 and 852 milliseconds;

FIG. 21 shows the sum of the eighteen records that are illustrated in FIGS. 3–20;

FIG. 22 shows a record of noise which would be typical of a marine cable layout produced during recording;

FIG. 23 shows the sum of the records shown in FIGS. 21 and 22;

FIG. 24 shows the result of applying a method according to this invention to the seismogram illustrated in FIG. 23; and, FIG. 25 shows a sum of the FIG. 3 record and the FIG. 22 noise.

DESCRIPTION OF THE PREFERRED EMBODIMENT

One of the fundamental ways for improving signal-to-noise ratio in experimental data, generally, is to repeat an experiment a number of times, record the results from each experiment, and average the recorded results. Such a procedure has often been used in seismic exploration recording, and with various ramifications. It is common practice to make recordings of seismic signal traces magnetically so that they may be reproduced readily. However, a typical digital seismic trace may contain 3,000 amplitude samples. Consequently, if the experiment, i.e., a seismic record is repeated n times, the summation requires that $3n \times 10^3$ samples must be recorded. Furthermore, in marine seismic operations, it is virtually impossible to repeat the experiment at the same location because of the nature of the procedure which involves a spread of detectors being towed behind a moving seismic boat.

However, a method according to this invention has been discovered which achieves the effectiveness of averaging down the noise, but does not require the excessive number of samples which would be the case in the foregoing discussion. Furthermore, a method according to this invention is particularly applicable to marine seismic operations. Thus, one aspect of the invention involves detonation of a plurality of seismic charges in sequentially spaced time, but each at the same location. That procedure is readily obtained in marine seismic operations because a plurality of seismic generators may be towed in a line so as to pass over the same location one after the other. Also, since the speed of the boat while recording is usually less than ten feet/second, the plurality of seismic generators such as explosive charges, or air guns, or the like may be arranged in a two with spacing such that each in succession may be fired close enough to the same location as to be considered as being at a single location. Such successive repeats of the same experiment are superimposed by making a single continuous seismic record having a time duration long enough to cover the maximum reflection time that is of interest plus the time for the series of charge detonations.

Figure 1:
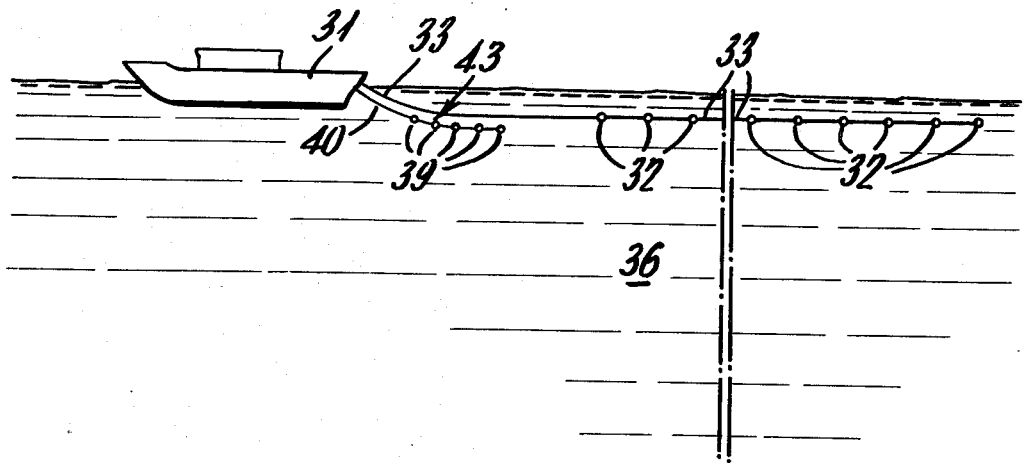
FIG. 1 is a schematic showing of a seismic boat with a string of detectors being towed behind a plurality of seismic charge generators that are to be sequentially detonated in accordance with the invention.

FIG. 1 illustrates a typical marine seismic surveying operation. There is a seismic boat 31 that is steered along a straight course during a recording procedure, and it maintains a moderate, steady speed. Towed behind the boat is a spread of detectors 32 which may be twenty-four in number and which extend out behind the boat 31 for a considerable distance. These detectors are connected to recording equipment (not shown) in the boat 31 via a cable 33. This is a standard arrangement for marine seismic operations, and there are usually a particular number, e.g., twenty-four of the detectors 32. They are connected electrically so that each detector (or group of detectors—not shown) will provide a single trace on a recording.

It will be understood that the procedure being described and to which this invention applies, is a reflection type seismic operation. Thus, there is a seismic signal generator such as an explosive or the like, to create a source of seismic energy. Again, with reference to FIG. 1, it will be understood that the seismic energy travels down through a body of water 36 and into the subsurface formations (not shown) below. This energy is reflected from subsurface layers, e.g., the "depths" indicated in FIG. 2, and back up to the detectors 32.

In a procedure according to this invention, there are a plurality seismic energy generators 39 (FIG. 1) which are spaced a predetermined distance apart along a towing and control cable 40. It will be understood that while FIG. 1 shows only five of the generators 39, any desired number may be employed.

A procedure according to this invention includes recording the seismic signals picked up by the detectors 32. The arrangement is such that each detector 32 will make a separate trace on a recording medium, e.g., magnetic tape. It will be understood that the recording medium (not shown) will be started shortly before a time zero which is when the first of the energy generators 39 is detonated. That time zero determines a location 43 where the first seismic source is generated. Then, after a succession of predetermined time intervals, each of the succeeding generators 39 will be towed past the location 43 and by controlling the times in relation to the speed of the boat 31, each will be detonated at that same location 43. During those successive detonations, the recording is continued and the total time of recording is long enough to receive reflected energies from the subsurface layers as far down as desired. Of course, such total time would be for the last of the series of detonations so that the sum total recording time would be the maximum time needed for receiving reflections of interest plus the total time of the intervals between detonations of the plurality of generators 39.

From the foregoing description, it will be clear that a method according to this invention includes the step of towing a plurality of seismic generators, i.e., generators 39 past a predetermined location, i.e., location 43. And, the step of detonating each of the generators 39 with timing such that they are each detonated at the same location 43, sequentially. At the same time a step of recording only one seismogram is carried out. The latter step is, of course, commenced before the first detonation and continues during each successive detonation plus thereafter, for a time long enough to obtain the maximum, i.e., deepest reflection data that is of interest. Following the foregoing recording procedure, the method includes transforming the seismogram which was recorded into the frequency domain. Then, constructing the frequency domain representations of the time intervals that were involved between each seismic generator detonation. And, using the same, superimposing the frequency domain representations of the seismic signals resulting from each detonation. Followed by inversely transforming the superimposed frequency domain representations back to the time domain. The result is a seismogram having an improved signal-to-noise ratio.

Figure 2:
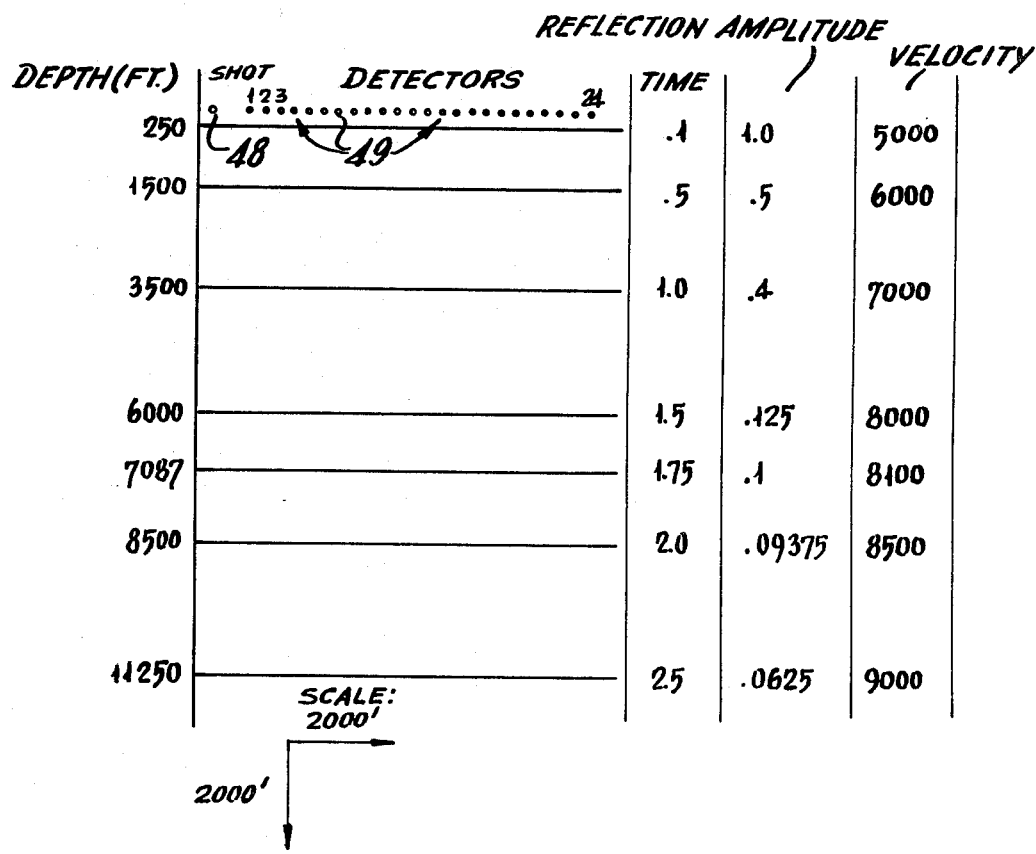
FIG. 2 is a schematic seismic model, showing the seismic charge and the geophone arrangement as well as indicating the subsurface velocities at the depths shown plus the time for reflections from reflecting layers indicated and the reflection amplitudes.

A synthetically created example of a procedure according to this invention is illustrated in FIGS. 2–25. FIG. 2 schematically indicates the seismic model including the geophone arrangement that was used in producing seismograms which are illustrated in FIGS. 3–25.

The seismic model according to FIG. 2 shows a shot point 48 that is located on a datum or zero depth relative to the reflecting strata lines that are shown with depths marked from 250 to 11,250 feet. There is a spread of twenty-four detectors 49 that are located on the same datum as the shot point 48, but beginning at a point spaced a short distance to the right of the shot point 48. As indicated, the vertical depths of subsurface reflecting strata are shown down the left-hand side of the diagram. The depth of each stratum is indicated in feet. On the right-hand side of the diagram, the seismic velocity at each depth is indicated which, of course, increases as the depth is greater. The other two columns on the right-hand side of the model diagram show in one column the time involved in the seismic energy traveling to and being reflected from each subsurface layer. It may be noted that the time increases from 1/10 to 2.5 seconds. In the other (middle) column, as indicated by the caption, it shows the amplitude of seismic energies being picked up by the geophones 49.

Using a seismic model with geophone arrangement according to the diagram of FIG. 2, there were eighteen seismograms developed. They are illustrated in FIGS. 3–20, and they were produced by firing charges in sequence at times 0, 2, 6, 14, 24, 40, 60, 88, 130, 180, 232, 288, 350, 422, 498, 608, 720, and 852 milliseconds. Those times are indicated by the caption at the top, but under each of the Figure numbers. It may be noted that each record was continued for four complete seconds, as is indicated down the left-hand side of each of the groupings of records, i.e. FIGS. 3–8; FIGS. 9–14; and, FIGS. 15–20.

FIG. 21 shows the sum of all eighteen records that are shown in FIGS. 3–20. And, FIG. 22 shows some typical noise which might be present during an actual seismic operation. Thus, the sum of FIGS. 21 and 22, (which is shown in FIG. 23) illustrates the results obtained by making a single record of a series of seismic charges at the same location with the expected noise on the system. In other words, FIG. 23 illustrates a typical single seismogram of the seismic signals received from a series of seismic charges at predetermined time intervals at the same location.

By applying the remaining steps of a method according to this invention to the one seismogram of recorded signals, e.g., as illustrated in FIG. 23, a resulting record would be like that illustrated in FIG. 24. Thus, the benefits of this invention are clearly shown when FIG. 24 is compared with FIG. 25, which latter shows the sum of the record illustrated by FIG. 3, and the noise indicated by FIG. 22. It should be noted that the improvement in signal-to-noise ratio is sufficient so that in FIG. 24 all seven reflection events (indicated by reference numbers 51–57) may be identified quite easily. Whereas, in FIG. 25 only the first five events 51–55 are clearly identifiable.

The transforming and constructing steps of this invention are readily carried out using computer software in order to carry out the Fourier transforms as required. And, it will be understood by one skilled in the art that it would be quite feasible, if desired, to create a special purpose processor which would be designed and constructed to implement the method according to this invention as an additional component in the marine data acquisition system, which is carried by the boat 31.

The method may be describe in terms of the mathematics which is applicable, by the following explanation. Assuming that there are n identical seismic source generators, and that the n sources are sequenced to fire at known times $\tau_1 < \tau_2 \ldots \tau_n$, where $\tau_n$ is less than T which is the maximum seismic reflection time of interest. Then, a recorded seismic trace, r(t) would contain n repeats of the experiment superimposed in a time duration $T_n = T + \tau_n$. However, the record r(t) would also contain noise no(t) so that the record trace may be represented by the following equation:

$$r(t) = s(t - \tau_1) + s(t - \tau_2) + \ldots + s(t - \tau_n) + no(t). \tag{1}$$

The Fourier transform of r(t) can be expressed as $$R(\omega) = S(\omega)(e^{-i\omega\tau_1} + e^{-i\omega\tau_2} + \ldots e^{-i\omega\tau_n}) + N(\omega) \tag{2}$$

where $S(\omega)$ and $N(\omega)$ are the Fourier transforms of s(t) and no(t).

Now, let $$E(\omega) = e^{-i\omega\tau_1} + e^{-i\omega\tau_2} + \ldots e^{-i\omega\tau_n} \tag{3}$$

Then, if for all $\omega$ in the recording pass band, $N(\omega)/E(\omega)$ is small relative to $S(\omega)$, then s(t), the inverse Fourier transform of $R(\omega)/E(\omega)$, is a good approximation for s(t). If no(t)=0, s(t)=s(t).

In accordance with the foregoing mathematical explanation, the method according to this invention consists of the following steps:

One. Fire n seismic sources at the known times $\tau_1, \tau_2, \ldots \tau_n$; $\tau_i < \tau_{i+1}$.

Two. Record one seismogram, r(t), of duration $T + \tau_n$, where T is greater than the maximum reflection time of interest.

Three. Compute the Fourier transform, $R(\omega)$, of r(t)

$$R(\omega) = \frac{1}{\sqrt{2\pi}} \int_{-\infty}^{\infty} e^{-i\omega\tau} r(t)dt. \tag{4}$$

Four. From the known $\tau_i$ compute:

$$E(\omega) = \sum_{j=1}^{n} e^{-i\omega\tau_j} \tag{5}$$

Five. Compute:

$$S(\omega) = R(\omega)/E(\omega). \tag{6}$$

Six. Compute the inverse Fourier transform s(t), of $S(\omega)$.

$$s(t) = \frac{1}{\sqrt{2\pi}} \int_{-\infty}^{\infty} e^{-i\omega t} S(\omega)d\omega. \tag{7}$$

s(t) is an approximation for the noise-free seismogram s(t), which ideally would result from a single source fired at time 0 in a noise-free environment.

It may be noted that the resulting record, e.g., FIG. 24, will have a larger signal-to-noise ratio than an ideal noise-free seismogram recorded in the presence of noise, e.g., FIG. 25. Also, the superposition of n repeats of the experiment (in accordance with this invention) requires recording only a single seismogram of time duration $T + \tau_n$ rather than n seismograms of duration T, if the experiment were repeatable n times. Furthermore, as indicated above, a marine seismic operation involves a relatively slow speed for the boat while recording, e.g., usually less than ten feet/second. Consequently, the plurality of guns (n) can be arranged in a tow so that each gun can be fired so close to the same location that the superposition of n seismograms is for all practical purposes a superposition of n repeats of the same experiment. On the other hand, it is virtually impossible using current technology and operating procedures for marine seismic operations, to repeat the experiment independently n times and average so as to achieve comparable signal-to-noise improvement.

While a particular embodiment according to the invention has been described above in considerable detail, this is not to be taken as in any way limiting the invention but merely as being descriptive thereof.

I claim:

1. In marine type seismic surveying, a method of improving signal-to-noise ratio, comprising
   generating a series of seismic charges at predetermined time intervals at the same location,
   recording only one seismogram of the seismic signals received from said series,
   said one seismogram having a time duration at least as long as the maximum reflection time of interest plus the total of said series of time intervals,
   transforming said seismogram to the frequency domain,
   constructing the frequency domain representation of said series of predetermined time intervals and using same to superimpose the frequency domain representations of the seismic signals resulting from each said seismic charge, and
   inversely transforming said superimposed frequency domain representations back to the time domain whereby a noise reduced seismogram is obtained.

2. In seismic surveying according to claim 1, wherein,
   said generating comprises towing a plurality of seismic generators past said same location, and
   detonating each of said towed generators at said same location.

3. In seismic surveying according to claim 2, wherein, said recording is digital.

4. In seismic surveying a method according to claim 1 wherein, said recording is digital.

5. In marine type seismic surveying, a method of improving signal-to-noise ratio, comprising
   towing a plurality of seismic generators past a predetermined location,
   detonating each of said generators at said predetermined location by timing said detonations realtive to said towing speed,
   recording one continuous seismogram of the seismic signals received from said detonations,
   said seismogram having a time duration at least as long as the maximum reflection time of interest plus the total time between all of said detonations,
   transforming said seismogram to the frequency domain,
   constructing the frequency domain representation of said time intervals and using same to superimpose the frequency domain representations of the seismic signals resulting from each said detonation, and,
   inversely transforming said superimposed frequency domain representations back to the time domain whereby a noise reduced seismogram is obtained.

6. In marine type seismic surveying, a method according to claim 5, wherein, said recording a digital.

* * * * *